United States Patent [19]

Kronberg

[11] Patent Number: 5,159,318
[45] Date of Patent: Oct. 27, 1992

[54] UNIVERSAL SINGLE POINT LIQUID LEVEL SENSOR

[76] Inventor: James W. Kronberg, 353 Church Rd., Beech Island, S.C. 29842

[21] Appl. No.: 598,302

[22] Filed: Oct. 16, 1990

Related U.S. Application Data

[63] Continuation of Ser. No. 346,490, May 2, 1990, abandoned.

[51] Int. Cl.$^5$ ............................................. G08B 21/00
[52] U.S. Cl. ..................................... 340/622; 340/618; 73/295
[58] Field of Search ............... 340/618, 622, 620, 450, 340/450.3; 73/295, 290 R, 304 R

[56] References Cited

U.S. PATENT DOCUMENTS

| | | | |
|---|---|---|---|
| 3,757,317 | 9/1973 | Kahn et al. | 340/622 |
| 3,878,541 | 4/1975 | Dodson, III | 340/622 |
| 4,656,464 | 4/1987 | Cliffgard | 340/622 |
| 4,818,976 | 4/1989 | Schmitt et al. | 340/605 |

Primary Examiner—Jin F. Ng
Assistant Examiner—Jeffery A. Hofsass
Attorney, Agent, or Firm—Harold M. Dixon; William R. Moser; Richard E. Constant

[57] ABSTRACT

A liquid level detector comprises a thermistor and circuitry for determining electrically if the thermistor is wet or dry and additionally, and continuously, if the thermistor is open or shorted. The voltage across the thermistor is filtered to remove low frequency electrical noise, then compared with a reference low voltage to determine if shorted and to a transition voltage chosen to be between the thermistor's normal wet and dry voltages to determine if the thermistor is wet or dry. The voltage is also compared to the supply voltage using a CMOS gate circuit element to determine if the thermistor is open. The gate passes both faults on to an LED to signal that a fault condition exists or indicates by another LED the wet or dry condition of the thermistor. A pump may be activated through a relay if the thermistor tests wet or dry, as desired.

7 Claims, 1 Drawing Sheet

UNIVERSAL SINGLE POINT LIQUID LEVEL SENSOR

CONTRACT STATEMENT

The United States Government has rights in this invention pursuant to Contract No. DE-AC09-76SR00001 between the U.S. Department of Energy and E. I. DuPont de Nemours & Co.

This is a continuation of application Ser. No. 346,490 filed May 2, 1990 now abandoned.

BACKGROUND OF THE INVENTION

1. Field of the Invention

The present invention relates to liquid level sensors. More specifically, the present invention relates to thermistor probes and circuitry for single point liquid level sensing and automatic pump control.

2. Discussion of Background and Prior Art

Liquid level detection is an important part of many industrial processes. When the level of a liquid used in a process is too low or too high, a pump may need to be activated to adjust the liquid supply. Exceptionally high or low liquid levels may indicate a malfunction of the process, perhaps with serious consequences if the process is not stopped or the malfunction is not corrected quickly by pump activation or other action. Automatic pump control is especially useful in such circumstances.

Automatic sensing of liquid levels is not new. In particular, thermistors, or thermal resistors, have been used to detect liquid levels that are too high or too low and send corresponding electrical signals. It is a characteristic of thermistors that their electrical resistance varies inversely with their temperature, and that when electrical current is passed through them, heat is generated. A rising liquid level can cool a current-heated thermistor by inundating it so that the liquid conducts excess heat away, thus causing the thermistor's temperature to drop. The drop in thermistor temperature matches a rise in thermistor resistance, as reflected by a voltage increase across the thermistor, signaling the higher liquid level.

Two patents issued to Cliffgard, U.S. Pat. No. 3,631,440 and 4,656,464, for liquid level detectors use the property of thermistors to detect liquid levels by the temperature change that results when the thermistor goes from a "wet" condition to a "dry" condition. The '464 patented invention includes error checking by shorting out a part of the circuitry only as the power is turned on or a switch is closed. Furthermore, the '464 thermistor probe is not checked directly.

Self-checking can be an important feature in certain applications since some liquids and process environments are hostile to level detectors. Corrosive and radioactive environments demand rugged, robust level detection equipment and circuitry. Furthermore, although a level detector may be built to function reliably in such environments, critical process control requires constant verification that the detector is working so that, if it should fail, damage resulting from the consequences of a rising or falling liquid level is avoided. Also, a liquid level detector should be able to detect both aqueous and organic liquids typically used in industrial processes to be truly versatile, and should also be compact enough not to interfere with the processing system.

SUMMARY OF THE INVENTION

An object of the invention is to provide a method and apparatus for detecting the level of liquid in a system.

Another object of the present invention is to provide a method and apparatus for detecting the level of liquid in a harsh environment, such as a radioactive or corrosive environment.

A still further object of the present invention is to provide a compact level detector.

Another object of the present invention is to provide a liquid level detector having a thermistor probe and capable of continuously checking to determine if the thermistor probe has failed or is damaged.

Yet another object of the present invention is to provide a responsive, rugged level detector, capable of detecting both aqueous and organic liquid levels.

Finally, an object of the present invention is to provide a level detector capable of providing process control voltage signal output.

To achieve the foregoing and other objects and in accordance with the purpose of the invention, as embodied and broadly described herein, the invention is a method and apparatus for detecting liquid levels comprising a thermistor probe in combination with electronic circuitry for evaluating the output of the probe for wet, dry or fault conditions and, in the preferred embodiment, activating corresponding visual and process control signals such as turning a pump on or off, as desired, to alter a liquid level in the desired direction.

The method and apparatus is responsive, rugged and compact, resistant to radioactive and corrosive environments and to thermal fatigue and shock, and capable of detecting both aqueous and organic liquid levels.

Reference is now made in detail to the present preferred embodiment of the invention, an example of which is given in the accompanying drawing.

A BRIEF DESCRIPTION OF THE DRAWING

The accompanying drawing, which is incorporated in and forms a part of the specification, illustrates the invention and, together with the description, serves to explain the principles of the invention. In the drawing:

The Figure is a circuitry diagram of the liquid level detector according to the present invention.

DETAILED DESCRIPTION OF THE INVENTION

Figure 1:
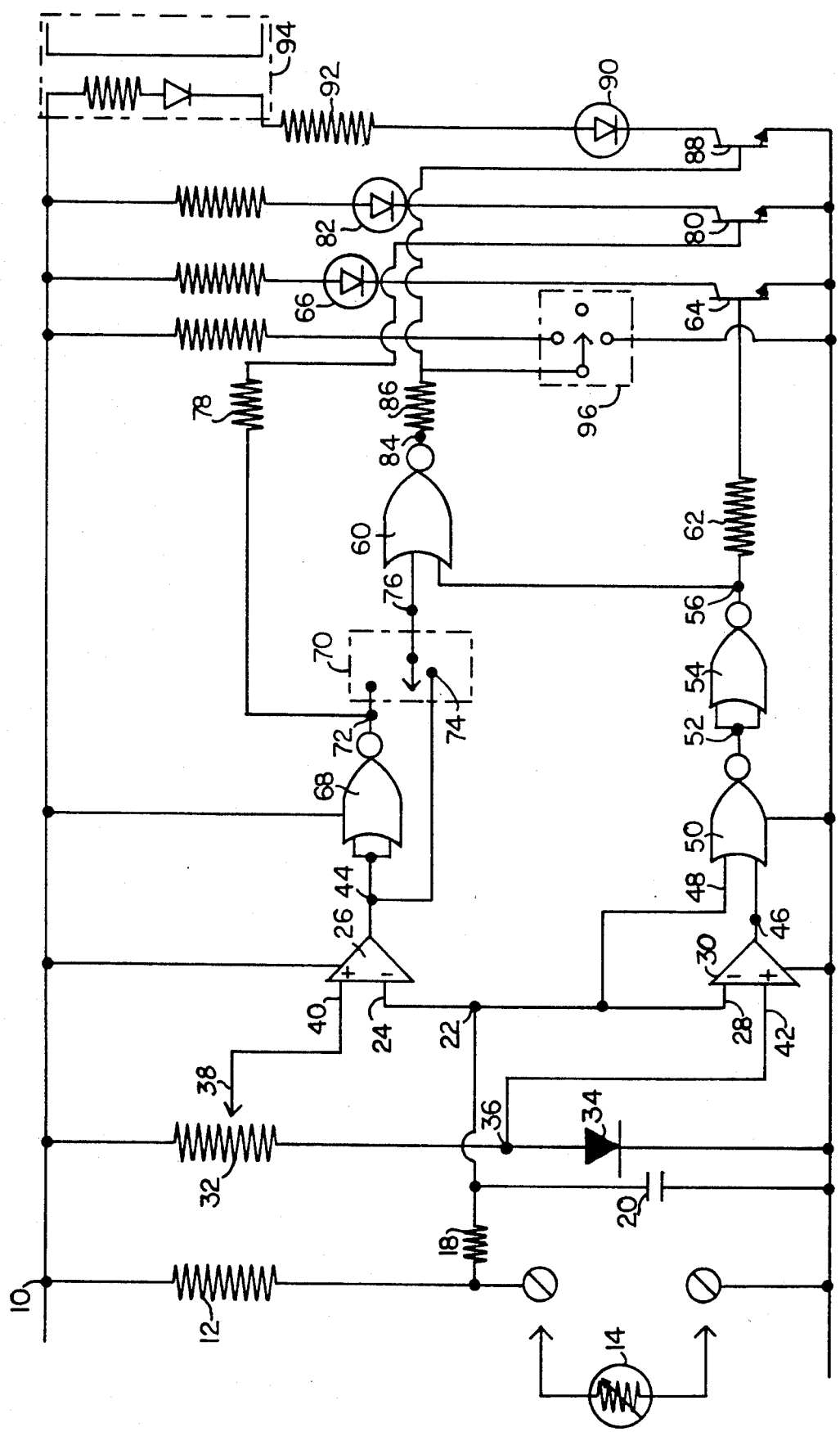

The present invention is a liquid level detection apparatus and method comprising a thermistor probe and related electronic circuitry. The thermistor mounted in the tip of the probe is any low-resistance thermistor capable, on a nominal supplied voltage, of self-heating in a dry condition to a temperature substantially above the hottest temperature of a liquid the level of which liquid it is to detect and having adequate change in heat conductivity between the wet and dry conditions. For responsiveness and durability, the thermistor is preferably of high conductivity and low heat capacity, fitted within a probe made of noncorrosive material such as stainless steel, which probe is also of low heat capacity and high thermal conductivity. A "FENWAL" 111-202CAK-B01 thermistor in a "FENWAL" 53AC housing makes a suitable probe.

The probe, or a plurality of probes arranged in a vertical array, is mounted at an appropriate location within the fluid-carrying system to detect movement of the level of liquid about a desired elevation. Its output voltage is transmitted by a pair of wires to a circuit board located either nearby or at some distance from the process environment, and preferably as part of a process control panel.

Referring now to the Figure, a voltage is supplied at 10 to resistor 12 and thermistor 14 connected in series. The resistances of resistor 12 and thermistor 14 are chosen so that, in a dry condition such as in air, significant self-heating of thermistor 14 takes place. Assuming thermistor 14 is working properly, as its temperature rises through such self-heating, its resistance will fall, unless a heat sink, such as a liquid inundating thermistor 14, begins to remove the heat. The reduction in resistance of thermistor 14 results in a voltage at 16 that is a small but non-zero fraction of supplied voltage 10. If the liquid level rises, inundating thermistor 14, its temperature will decrease and its resistance increase so that voltage 16 increases but still remains less than one-half of supply voltage 10, as thermistor 14 equilibrates.

If thermistor 14 becomes damaged or fails, it will be either shorted or open. If thermistor 14 is shorted, the voltage at 16 drops to zero. If thermistor 14 is open, voltage 16 will be at least one-half supply voltage 10 and will typically be equal to supply voltage 10.

In the preferred embodiment, the voltage of 16 may be carried by an extended cable to a control panel where a resistor 18 and a capacitor 20 combine to form a simple low pass filter for eliminating electrical noise picked up by the cable and providing a filtered voltage at 22. Alternatively resistor 18 and capacitor 20 may be eliminated and replaced with a short and an open circuit, respectively.

Filtered voltage 22 is applied to a first inverting input 24 of a first voltage comparator 26 and to a second inverting input 28 of a second voltage comparator 30. A potentiometer 32 and silicon diode 34 form a voltage divider chain having one fixed output voltage 36 of approximately 0.6 volts, serving as a reference low voltage, and an adjustable output voltage 38 equal to between 0.6 and the level of supply voltage at 10. Adjustable output voltage 38 of potentiometer 32 is connected to a first noninverting input 40 of first comparator 26; fixed output voltage 36 is connected to a second noninverting input 42 of second comparator 30. Adjustable output voltage 38 may be tailored to match the characteristics of thermistor 14 and is preferably set to a voltage approximately halfway between the "wet" and the "dry" voltage of thermistor 14 as produced at 22 to serve as a transition voltage.

First comparator 26 then produces a first output 44 that is high when thermistor 14 is "dry" or shorted and low when thermistor 14 is "wet" or open. When thermistor 14 is shorted, voltage 22 is less than 0.6 volts and second comparator 30 produces an output 46 that is high, otherwise the output of second comparator 30 is low.

Voltage 22 is also fed directly into an input 48 of CMOS "NOR" gate 50 functioning as a logic signal in that an input voltage higher than one half supply voltage 10 is read as "high" and an input voltage less than one half the supply voltage is read as "low." Output 46 of second comparator 30 is also fed into CMOS gate 50. Thus, when voltage 22 is either greater than one-half supply voltage 10 (suggesting an "open" circuit at thermistor 14) or less than 0.6 volts (suggesting a "short" at thermistor 14), the corresponding input voltage 22 or 46, respectively, to gate 50 is read as "high" and an output 52 of gate 50, upon inversion, becomes "low". Output 52 is again inverted, by a CMOS gate 54, to produce a "high" voltage at 56 which is an input 58 to "NOR" gate 60 when either of the above conditions is present; that is, when the voltage at 22 is outside working limits because thermistor 14 is open or shorted.

Voltage 56, passing through resistor 62 and transistor 64, provides a "fault" alarm and may preferably be used to light a red light emitting diode (LED) 66 and possibly sound an audible alarm (not shown) as a warning.

Output 44 of comparator 26 is fed to logic gate 68 where it is inverted. A switch 70 allows selection of inverted voltage 72 or noninverted voltage 74 providing the options "OUTPUT ON DRY" or "OUTPUT ON WET", respectively. The selected signal is fed to a second input 76 of "NOR" gate 60. Output voltage 72 from gate 68 is also fed through resistor 78 and transistor 80 to drive, preferably, a green LED 82 indicating, when on, that thermistor 14 is "wet" (or possible that a short exists).

Gate 60 receiving signals both from gate 54 and switch 70 produces a high output voltage 84 only when both input voltages 76 and 58 are low, in which case no "fault" is present and input voltage 76 is determined by selection of the position of switch 70. In this case current through resistor 86 and transistor 88 produces an output current which flows through an optional amber LED 90 to produce a visual indication, through current-limiting optional resistor 92 and then through optical isolator 94 which transmits output signal to control circuitry to respond, for instance, by initiating a pump (not shown). In the preferred embodiment isolator 94 is a solid state relay controlling an AC signal which can drive such a pump directly.

A manual override switch 96 provides a means for turning a pump on, off or letting the thermistor direct the pump automatically.

Any circuits instead of going through a transistor-resistor sequence could be used to drive other CMOS logic and transistor-resistor combinations that provide open collection type outputs compatible with standard transistor-transistor logic.

In the particular embodiment shown in the Figure, the following components were employed:
 Input Voltage—15 volts
 Resistor 12—220 to 970 ohm, 1. watt
 Resistor 18—100 kOhm
 Capacitor 20—2.2 microFarads
 Potentiometer 32—10 KOhms
 Diode 34—1N 914
 First Comparator 26—324 type
 Second comparator 30—324 type
 CMOS Gates (50, 54, 60 and 68)—4001 type
 Resistors 62, 78 and 86—4.7 KOhms each
 Transistors 66, 82 and 90—2N 2222 type each The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. Apparatus for detecting whether the level of a liquid is outside a desired range, said liquid having a first temperature, said detector comprising:

means positioned proximate to said liquid level for generating an electrical signal that varies with the temperature of said generating means;

means for heating said generating means to a second temperature when said generating means is not in said liquid, said second temperature higher than said first temperature, said heating means in electrical connection with said probe;

electrical circuitry means in electrical connection with said generating means for identifying a change in said electrical signal in response to a temperature change in said generating means as said liquid level rises with respect to said probe whereby the temperature of said generating means will vary between said first and said second temperatures, said electrical circuitry means producing a first output indicative of said signal change, said electrical circuitry means continuously testing said electrical signal for open and shorted conditions and producing a second and a third output indicative of said open or shorted conditions, respectively.

2. The apparatus as recited in claim 1, further comprising pump means responsive to said first output of said electrical circuitry means for adjusting the level of said liquid.

3. The apparatus as recited in claim 1, further comprising pump means responsive to said first output of said electrical circuitry means for adjusting the level of said liquid, said pump means automatically activating when said first output indicates said liquid level has decreased.

4. The apparatus as recited in claim 1, further comprising pump means responsive to said first output of said electrical circuitry means for adjusting the level of said liquid, said pump means automatically activating when said first output indicates said liquid level has increased.

5. The apparatus as recited in claim 1, wherein said generating means further comprises at least one probe, each probe of said at least one probe having a housing and a thermistor within said housing.

6. The apparatus as recited in claim 1, wherein said generating means further comprises a plurality of probes arranged in a vertical array, each probe of said at least one probe having a housing and a thermistor within said housing.

7. The apparatus as recited in claim 1, wherein said first, second and third outputs activate light emitting diodes.

* * * * *